United States Patent [19]

Vogel et al.

[11] 3,937,411

[45] Feb. 10, 1976

[54] TAPE ROLL HOLD-DOWN DEVICE

[75] Inventors: Charles A. Vogel; William T. Lombardi, both of San Jose, Calif.

[73] Assignee: American Videonetics Corporation, Sunnyvale, Calif.

[22] Filed: May 23, 1974

[21] Appl. No.: 472,536

[52] U.S. Cl. ............................................. 242/68.3
[51] Int. Cl.² ........................................ B65H 17/02
[58] Field of Search........... 242/68.3, 68; 249/219 W

[56] References Cited
UNITED STATES PATENTS

| | | | |
|---|---|---|---|
| 1,481,086 | 1/1924 | Fitz .................................. | 242/68.3 |
| 2,657,866 | 11/1953 | Lungstrom ..................... | 242/68.3 X |
| 3,315,937 | 4/1967 | Eriksson ......................... | 249/219 W |
| 3,326,489 | 6/1967 | Lessler ............................. | 242/68.3 |
| 3,558,072 | 1/1931 | Wakshorg ......................... | 242/68.3 |

*Primary Examiner*—Edward J. McCarthy
*Attorney, Agent, or Firm*—McDougall, Hersh & Scott

[57] ABSTRACT

A tape roll hold-down device for retaining a roll of tape upon a mounting post includes a transversely extending support surface for engaging and supporting the underside of a hub of a roll of tape. The support post extends upwardly through the plane of the support surface and carries a pivotable toggle mounted upon a pivot pin extending transversely of the post. The toggle includes a pair of wedge portions whereby the toggle can be first pivoted transversely of the axis of the support post and then thrust in a wedging manner between the pivot pin and the adjacent surface of the tape roll hub. In releasing the toggle in one embodiment, it needs merely to be thrust beyond the edge of the opening in the hub so that lifting the hub will pivot the distal end of the toggle upwardly and the pivoting end downwardly into the opening of the hub as the hub is lifted. Another embodiment takes advantage of upwardly protruding surface portions on the side face of the hub for engaging and upwardly camming the toggle member so as to move the pivoted end of the toggle member into the hole in the hub.

7 Claims, 9 Drawing Figures

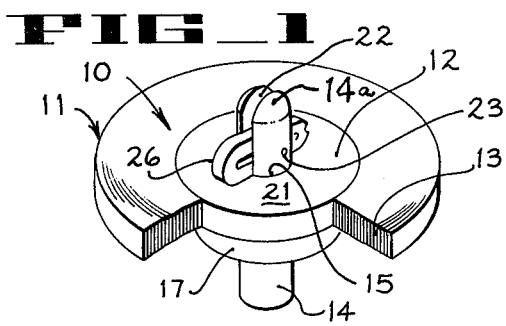
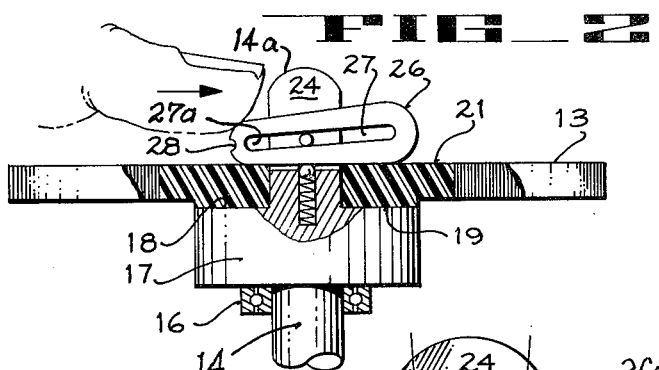
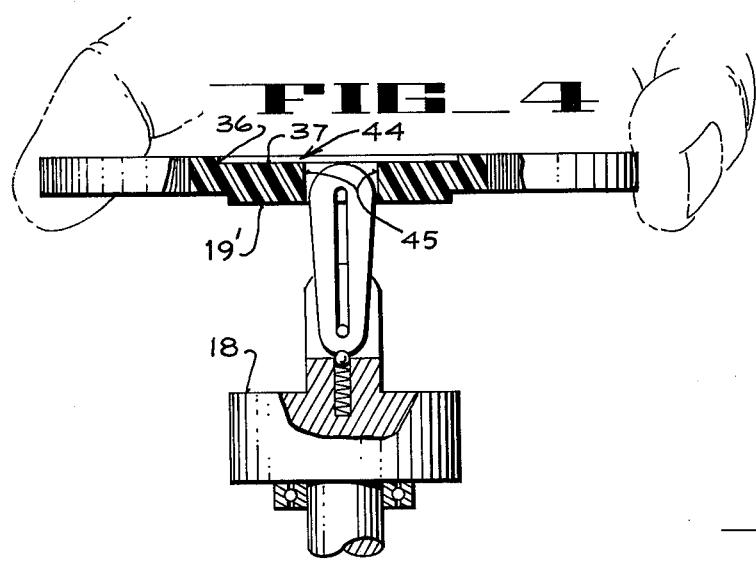
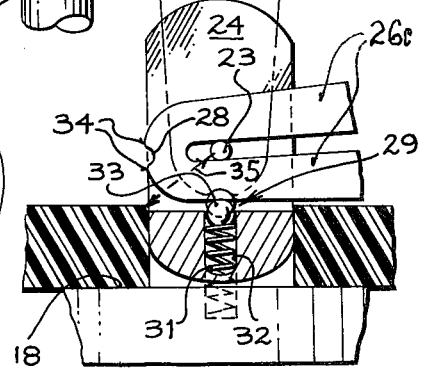
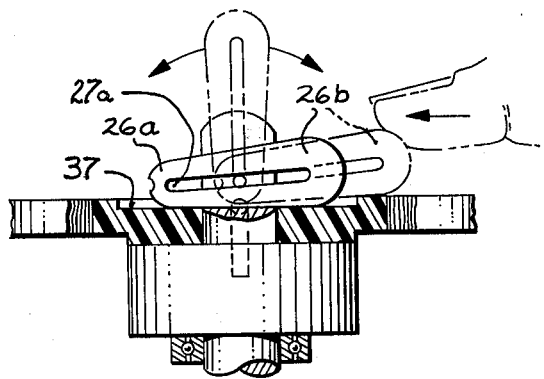
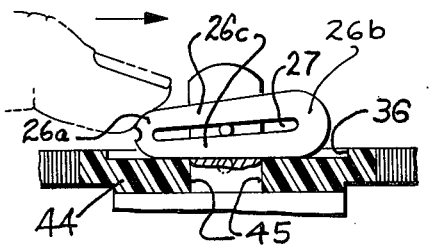
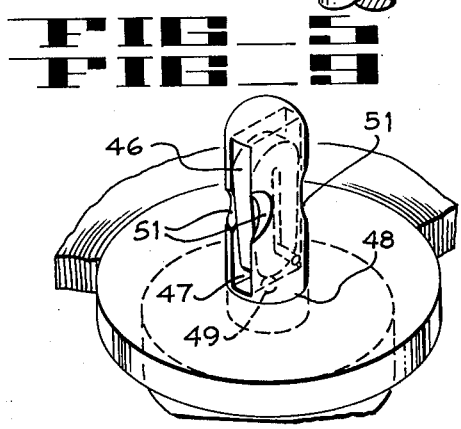
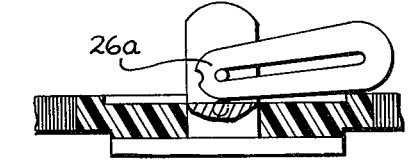
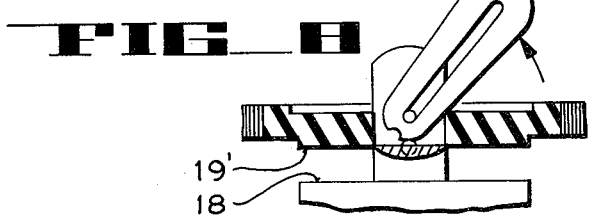

TAPE ROLL HOLD-DOWN DEVICE

BACKGROUND OF THE INVENTION

This invention pertains to devices for retaining elongate, pliant ribbon material formed as a roll of film, paper tape, magnetic recording tape or the like, all hereinafter referred to simply as a roll of tape, mounted upon a support post. This invention is particularly useful in providing a tape roll hold-down device for magnetic tape recording machines.

Heretofore, great numbers of different types of hold-down devices have been marketed, each claiming certain advantages and most all including certain disadvantages as known.

One particularly annoying disadvantage of most hold-down devices is found in their usual need to be decoupled from the mounting spindle or other rotational element in order to mount the roll of tape to the rotating element or support post. This singular deficiency obviously leads to inadvertent loss of such hold-down devices by personnel using the equipment.

It is further to be appreciated that these hold-down devices are employed by personnel operating the equipment who are both left-handed and right-handed. However, many of such devices are manufactured for people who are right-handed. This obviously causes some limited frustration and loss of efficiency by left-handed personnel operating this equipment.

Finally, it is a great advantage to make devices of this kind in as simple a manner as possible for the personnel using them in order to increase efficiency.

Accordingly, the present invention provides a hold-down construction which can operate both left-handed and right-handed, comprises a single construction with no parts to be mislaid or otherwise lost, and simply employs a wedge for attaching a roll while supplying sufficient force to maintain a tight mounting.

SUMMARY OF THE INVENTION AND OBJECTS

In general, there has been provided a tape roll hold-down device for securing a roll of tape, film, or other pliant elongate ribbon, to a support surface including a mounting post adapted to receive thereon a roll of tape of a type including a hub having a mounting opening formed centrally thereof and extending between the opposite side face surfaces of the hub. The opening permits the roll to be passed over said post to permit a side face surface of said hub to engage the support surface. Means for securing the hub to the support surface includes an elongate toggle opening formed substantially in the plane of a diameter of the mounting post, the axis of the mounting post lying substantially in the aforementioned plane. An elongate toggle member is disposed within the toggle opening and formed with a slot therein. Further, pivot means cooperate with the slot for supporting the toggle member within the toggle opening. The displacement between one end of the slot in the toggle member and the adjacent peripheral extremity of the toggle member is less than the displacement between the pivot axis and the nearest edge of the mounting opening of the hub. This permits the toggle member to pivot to a position sufficiently aligned with the post so as to pass the hub of a roll of tape thereover and onto the post to a position permitting the toggle member to lie crosswise of the post and against the outer side surface of the hub. At this point, the toggle member can be moved in a crosswise direction so as to locate a portion of the toggle member on opposite sides of the post simultaneously.

In a preferred embodiment, the crosswise movement of the toggle member wedges a portion of the toggle between the pivot axis and a side surface of the tape roll hub.

In general, it is an object of the present invention to provide an improved tape roll hold-down device.

It is another object of the present invention to provide means for tightly wedging a hub of a roll of tape into a seated position for operation.

It is a further object of the invention to provide a simple tape roll hold-down device operable by movement of a toggle member in each of two opposite directions of finger movement.

Yet another object of the invention is to provide a tape roll hold-down device employing a toggle member including a slot located therein for engaging a pivot means with an axis extending transversely to the axis of a support post.

An additional object of the invention is to provide a tape roll hold-down device of a type whereby a toggle is employed for hold-down and release movements crosswise of the axis of a support post and whereby, during release operation, after laterally positioning the toggle, the tape roll can merely be lifted from the support post to remove the roll from the machine.

Yet another object of the invention is to provide a tape roll hold-down device with a toggle member for retaining a roll of tape together with means for readily releasably holding the toggle aligned axially of the support post to assist in loading a roll onto the post and with means for yieldingly holding the toggle transversely to the support post.

These and other objects of the invention shall become more readily evident from the following detailed description of preferred embodiments when considered in conjunction with the drawings.

BRIEF DESCRIPTION OF THE DRAWINGS

FIG. 1 shows a diagrammatic perspective view, partially cut away, of a tape roll hold-down device according to the invention;

FIG. 2 shows a side elevation view of FIG. 1 with portions shown in section for clarity;

FIG. 3 shows an enlarged detail view of a portion of FIG. 2;

FIG. 4 shows a side elevation view of another embodiment of the invention shown in a loading condition and with portions partially in section for clarity;

FIG. 5 shows the embodiment of FIG. 4 in a loaded and tightly secured position;

FIGS. 6, 7 and 8 are views showing a sequence of movements of the toggle member during release of a roll; and FIG. 9 shows a diagrammatic perspective view according to another embodiment of the invention.

DETAILED DESCRIPTION OF PREFERRED EMBODIMENTS

A hold-down assembly 10 retaining a roll of tape 11 in a tightly clamped position is shown in FIG. 1. The roll of tape 11 includes a hub 12 upon which a length of recording tape or film or other pliable ribbon 13 is wrapped, all of which are hereinafter referred to merely as "tape."

As disclosed herein, a mounting post 14 in the form of a rotatable spindle is mounted for rotation within bearings, such as the top bearing 16, comprising an inner race secured to spindle 14 and an outer race secured to a mounting plate or other fixture (not shown). Ball bearings or other bearing elements are disposed between the inner and outer races of these bearings to permit post 14 to rotate.

Post 14 supports a transversely extending flange-like support member 17 formed with a seating surface or support surface 18 for engaging the adjacent one 19 of the two side face surfaces 19, 21.

An elongate toggle opening 22 substantially in the plane of a diameter of post 14 is formed with the axis of post 14 lying substantially in the plane of opening 22. Pivot means in the form of pin 23 extends across toggle opening 22 substantially normal to the confronting faces 24 thereof.

An elongate toggle member 26 is disposed within toggle opening 22 and formed with a slot 27 therein. Pivot pin 23 passes through slot 27 so as to permit toggle member 26 to be slidably moved transversely of the axis of post 14. Also upon locating pivot pin 23 at the left end (FIG. 3) of slot 27, toggle member 26 can be pivoted both clockwise and counterclockwise about pin 23 to a transversely extending position relative to the axis of post 14.

The pivoting end 27a of slot 27 is disposed sufficiently close to the pivoting end 26a of toggle member 26 to permit the outer periphery of end 26a to be positioned (FIG. 3) to swing into opening 15 upon lifting the distal end 26b.

Thus, the displacement between the periphery of end 26a and pivot pin 23 is less than the shortest radius 35 from pin 23 to the edge of opening 15 in hub 12 so as to permit toggle member 26 to pivot about pin 23 to a position aligned with post 14. In this position, hub 12 passes thereover onto the upper end of post 14.

Pivot pin 23 lies sufficiently above support surface 18 so as to permit toggle member 26 to be pivoted to lie crosswise of the axis of post 14 and against the outer side face surface 21 of hub 12 has been seated onto surface 18. Movement of toggle member 26 in a direction crosswise of post 14 serves to dispose portions of member 26 on opposite sides of the axis of post 14 simultaneously and thereby retain hub 12 upon post 14.

Means for yieldingly holding toggle member 26 in a readily releasable position aligned axially of post 14 so as to aid in placing hub 12 over the bifurcated end 14a of post 14 includes a notch 28 formed in the exterior end surface of the pivoting end 26a of toggle member 26. Notch 28 cooperates with means forming a readily releasable, resilient detent assembly 29 in post 14 movable into and out of the notch as toggle member 26 is moved either clockwise or counterclockwise from its axially aligned disposition.

Thus, a resilient detent assembly 29 comprises a spring 31 disposed within a bored hole 32 located axially of post 14 and containing a metal detent ball 33.

Notch 28 is flanked by and formed between a pair of rounded surfaces 34 whereby as toggle member 26 approaches something on the order of 30° from the axis of post 14, these surfaces in conjunction with the spring-loaded ball detent 33 serve to carry toggle member 26 into an extension of the axis of post 14. Similarly, as toggle member 26 is pivoted clockwise or counterclockwise from its axial position relative to post 14, the spring-loaded ball 33 and the surfaces 34 cooperate to swing toggle member 26 downwardly into a transverse orientation and to retain member 26 in such orientation.

From the foregoing, it will be readily evident that the operation of the embodiment shown in FIGS. 1, 2 and 3 proceeds as now to be described.

Initially, toggle member 26 is manually disposed axially of post 14 whereby hub opening 15 can pass downwardly to a seated position upon support surface 18 of member 17.

At that position, toggle member 26 can be moved manually clockwise or counterclockwise and, as shown in FIG. 1, toggle member 26 has been moved counterclockwise to the left. Subsequently, toggle member 26 can be pushed crosswise of the axis of post 14 until portions of toggle member 26 are disposed on both sides of hub opening 15.

In many instances, the foregoing arrangement would be satisfactory to retain a roll mounted upon a spindle as, for example, in moving picture apparatus and the like, but in certain tape recording embodiments, it has been found desirable to mount hub 12 tightly upon support surface 18. Accordingly, toggle member 26 includes a wedge-shaped portion 26c disposed on each side of slot 27.

Thus, the two wedge-shaped portions 26c are each defined between slot 27 and an adjacent side edge of toggle member 26 whereby, with toggle member 26 laid against the outer side face surface 21 of hub 12, subsequent movement of toggle member 26 crosswise of the axis of post 14 serves to drive a wedge portion 26c thereof between pivot pin 23 and the outer side face surface 21. Wedge portions 26c are thicker than the clearance between pivot pin 23 and side face surface 21 when seated on surface 18 so that the wedge portion 26c can urge the opposite side face surface 19 of hub 12 tightly against support surface 18.

To remove tape roll 11 from post 14, toggle member 26 is simply pushed to its unwedged position until the rounded ends 34 of toggle member 26 have been moved substantially within a radius 35 extending from pin 23 to the hearest edge of hub mounting opening 15 (FIG. 3). In that position, a tape roll can be lifted and at the same time toggle member 26 will be drawn upwardly to a detented, axially extending position permitting tape roll 11 to be readily removed.

Movement of the extremity of surfaces 34 need not be fully within radius 35 since surfaces 34 serve to cam toggle member 26 laterally as they strike the edge of opening 15.

Thus, one end 27a of slot 27 terminates sufficiently close to the adjacent end 26a of toggle member 26 to permit end 26a to be positioned to swing into opening 15 of hub 12 merely upon lifting of toggle member 26 (as by merely lifting the roll of tape or otherwise).

According to another embodiment, means are provided for camming toggle member 26 upwardly at its distal end 26b in response to crosswise movement in releasing toggle member 26.

Thus, toggle member 26 is rounded on its outer end 26b and adapted to engage an upwardly directed surface portion, such as the rim 36 protruding upwardly from the outer side face surface 37 and extending around the peripheral edge margin of hub 44 so as to engage and lift the radially outer end 26b of toggle member 26 in response to crosswise movement of toggle member 26 toward its unwedged position such aas shown in FIGS. 6 and 7.

Due to the dimensions of toggle member 26 and the location of rim 36, the lifting movement provided by the foregoing camming action can only occur when toggle portion 26a has been moved substantially within radius 35. Thus, the upward camming of portion 26b serves to dispose the pivoting end 26a in a position relative to opening 45 in hub 44 so that subsequent lifting of the roll of tape causes the edge of opening 45 to engage toggle member 26 (FIG. 8) and move same sufficiently for removal of hub 44 therefrom.

According to another embodiment of the invention as shown in FIG. 9, a toggle member 46 is mounted within an elongate toggle opening 47 formed within a mounting post 48 of a type carrying a support element therearound. The function and operation of toggle member 46 and detent 49 are the same as described above but with the added advantage that the toggle member need not be the endmost portion of post 48. As shown in FIG. 9, it is readily evident that toggle member 46 lies in a fully protected location within opening 47. Relieved portions 51 are cut into opposite sides of post 48 to permit easy manual access to member 46.

In the embodiment in FIG. 9, detent 49 can be located in the upper end of post 48.

We claim:

1. A device for holding a roll of tape to a support surface comprising a mounting post disposed to extend away from said surface and adapted to receive thereon a roll of tape of a type including a hub having a mounting opening formed centrally thereof for receiving said post therethrough, an elongate toggle opening formed substantially in the plane of a diameter of said post, the axis of said post lying substantially in said plane, an elongate toggle member disposed within said toggle opening and formed with an elongate slot therein, pivot means cooperating with said slot for supporting said toggle member within said toggle opening, the displacement between one end of said slot and the adjacent peripheral extremity of said toggle member being less than the displacement between the axis of said pivot means and the nearest edge of said mounting opening to permit said toggle member to pivot to a position sufficiently aligned with said post to pass said hub thereover and onto said post to a position permitting said toggle member to lie crosswise of said post and against the outer side face surface of said hub on opposite sides of said post simultaneously.

2. A device according to claim 1 in which said toggle member is formed to include a wedge portion defined between said slot and a side edge of said toggle member, said wedge portion being movable in a direction crosswise of said post between the axis of said pivot means and the outer side face surface of said hub to force said hub against said support surface.

3. A device according to claim 1 wherein the pivoting end of said slot is disposed sufficiently close to the pivoting end of said toggle member to permit the outer periphery of the pivoting end of the toggle member to be positioned to swing into said opening of said hub upon lifting the distal end of said toggle member.

4. A device according to claim 1 further comprising means for readily releasably holding said toggle member aligned with the axis of said post.

5. A device according to claim 1 in which said toggle member includes on its outer end an inclined surface portion adapted to engage an upwardly directed surface portion protruding from the first named said side face surface so as to engage and lift the outer end of said toggle member in response to said crosswise movement of said toggle member toward said retracted position, said lift serving to dispose the inner end of said toggle member in a position relative to said opening in said hub to permit lifting of said roll to cause the edge portion of said opening to engage said toggle member and move same sufficientyl for removal of said roll therefrom.

6. A device according to claim 1 in which said post includes a bifurcated distal end portion forming said toggle opening through which said toggle member moves, said toggle member extending sufficiently beyond the end of said post when aligned therewith to permit the distal end of the toggle member to be manually moved clockwise and counterclockwise about the axis of said pivot means.

7. In combination a length of tape wrapped about a hub to form a roll thereof, said hub including a mounting opening formed centrally thereof and extending through opposite side face surfaces of said hub, means forming a support surface for engaging one of said side face surfaces and supporting said hub therefrom, an elongate toggle opening formed substantially in the plane of a diameter of said post, the axis of said post lying substantially in said plane, an elongate toggle member disposed within said toggle opening and formed with an elongate slot therein, pivot means cooperating with said slot for supporting said toggle member within said toggle opening, the displacement between one end of said slot and the adjacent peripheral extremity of said toggle member being less than the displacement between the axis of said pivot means and the nearest edge of said mounting opening to permit said toggle member to pivot to a position sufficiently aligned with said post to pass said hub thereover and onto said post to a position permitting said toggle member to lie crosswise of said post and against the outer side face surface of said hub on opposite sides of said post simultaneously.

* * * * *

Disclaimer 3,937,411.—*Charles A. Vogel*, and *William T. Lombardi*, San Jose, Calif. TAPE ROLL HOLD-DOWN DEVICE. Patent dated Feb. 10, 1976. Disclaimer filed Oct. 5, 1977, by the assignee, *American Videonetics Corporation*.

Hereby enters this disclaimer to claims 1–3 and 6–7 of said patent.

[*Official Gazette December 6, 1977.*]